(No Model.) 2 Sheets—Sheet 1.
E. FULLFORD.
REGENERATIVE GAS LAMP.
No. 433,341. Patented July 29, 1890.
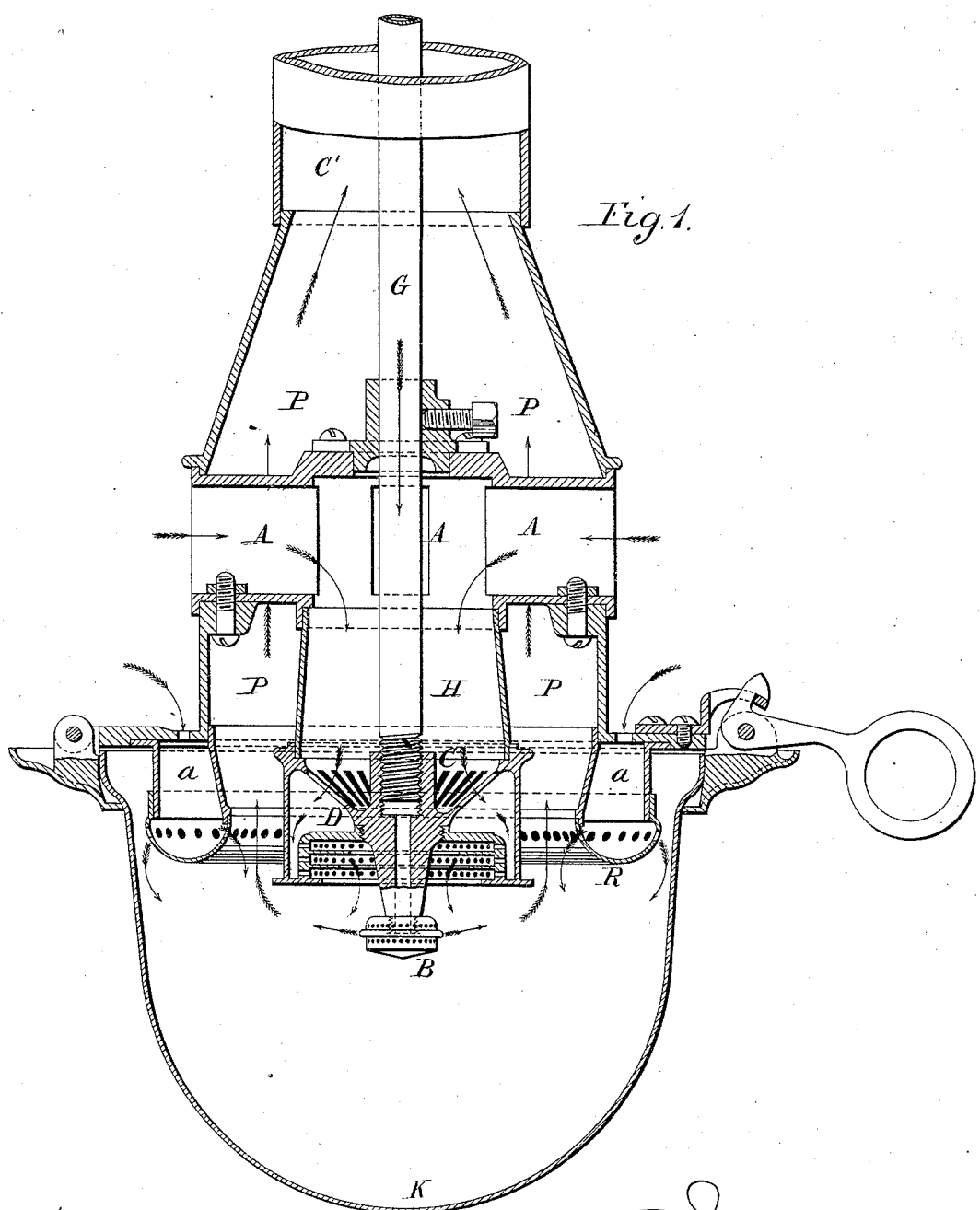

(No Model.) 2 Sheets—Sheet 2.
E. FULLFORD.
REGENERATIVE GAS LAMP.
No. 433,341. Patented July 29, 1890.
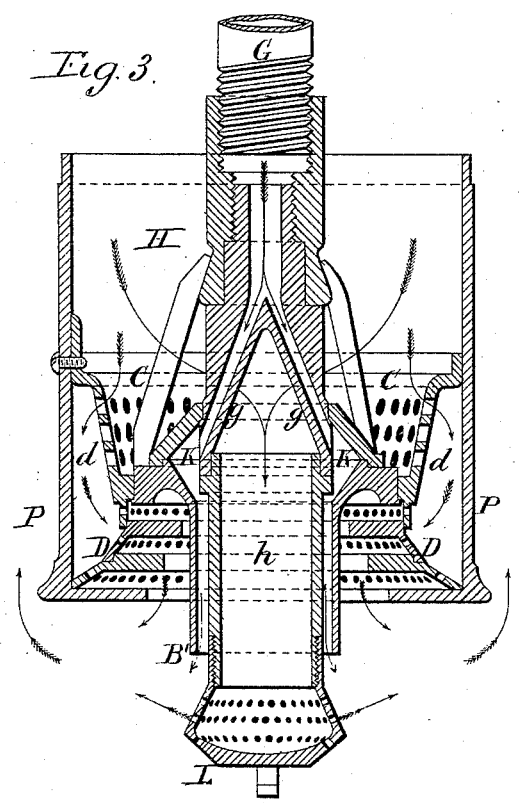
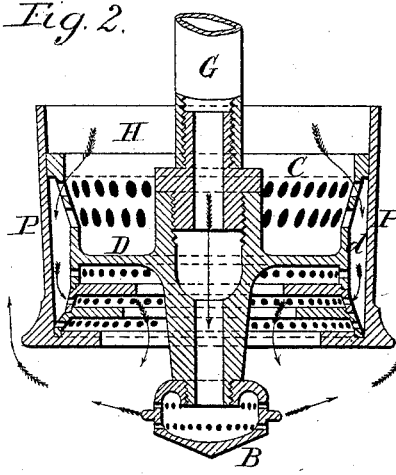

UNITED STATES PATENT OFFICE.

EDWIN FULLFORD, OF CLAPTON, COUNTY OF MIDDLESEX, ENGLAND, ASSIGNOR OF ONE-HALF TO HENRY THEODORE VAN LAUN, OF SAME PLACE.

REGENERATIVE GAS-LAMP.

SPECIFICATION forming part of Letters Patent No. 433,341, dated July 29, 1890.

Application filed April 8, 1890. Serial No. 347,093. (No model.) Patented in England June 27, 1889, No. 10,447, and in Belgium March 21, 1890, No. 89,910.

*To all whom it may concern:*

Be it known that I, EDWIN FULLFORD, a citizen of England, residing at 8 London Road, Clapton, in the county of Middlesex, England, have invented new and useful Improvements in Regenerative Gas-Lamps, (for which I have obtained a patent in Belgium, dated March 21, 1890, No. 89,910, and in Great Britain by an application for patent, which patent, when granted, will bear date June 27, 1889, No. 10,447,) of which the following is a specification.

My invention relates to that description of gas-lamps with inverted burners known as "regenerative" lamps, in which the gas-supply passes down a central tube or passage to the burner, while the air-supply is led in contact with surfaces that are heated by the flame and the hot products of combustion proceeding therefrom, a portion of the air being made in some cases to pass down centrally through the burner, so as to issue through orifices situated centrally below the flame. I shall describe my invention as applied to such lamps, referring to the accompanying drawings.

Figure 1 is a vertical section of a lamp embodying my improvements. Fig. 2 is a part vertical section showing a modified construction of the air-heating screens. Fig. 3 is a part vertical section showing a modification of the burner to suit central air-supply.

Referring to Fig. 1, G is the gas-supply pipe, terminating in a circular burner B, from which flame issues horizontally outward, bending upward within a hollow reflector-ring R to the passages P, by which the hot products of combustion pass up to the chimney C'. Air entering by passages A, which cross the passages P, passes down the central channel H, through the perforations of a screen C, and then through a number of perforations in the turned-down lips of rings D to the flame. These rings D, instead of being made in one piece, as shown in Fig. 1, may be separate rings placed one above another. The air thus suppled to the upper side of the flame is highly heated by its contact with the walls of the passages conducting away the hot products of combustion, and also by its passage through the heated screen C and heated rings D. Besides the air thus supplied to the flame, additional air enters the annular channel $a$ and hollow reflector R, and issues through perforations of the reflector to supply the lower and outer side of the flame, this air being also heated by its passage through $a$ and R. The burner, reflector, and passages are inclosed within a glass globe K.

Referring now to Fig. 2. As in Fig. 1, G is the gas-pipe, and B the burner. H is the central channel for the descending air, and P is the passage for the hot products of combustion upward. The perforated screen C and the perforated rings D are in this case made in a form somewhat differing from that shown in Fig. 1, the air finding its way through the perforations of C into an annular space $d$, and thence through the perforations of D.

Fig. 3 is a vertical section of the central portion of the lamp with the burner modified so as to admit of a central supply of heated air to the under side of the flame. In this case the gas from pipe G, by two or more branches $g$, enters an annular space K, surrounding a central tube $h$, and issues thence by an annular mouth B', which constitutes the burner. The air from the channel H passes partly through the perforations of C and D, as in Fig. 2, to the upper side of the flame, and partly between the branches $g$, down the tube $h$ to a perforated head L, whence it issues heated to supply the under side of the flame.

The construction shown in Fig. 3 is such that the central air-tube $h$ and the piece containing the gas-passages $g$ can be readily taken out, giving access for cleaning without disturbing other parts of the lamp.

Having thus described the nature of this invention and the best means I know for carrying the same into practical effect, I claim—

A regenerative gas-lamp having the vertical passages P to the chimney, the central channel H, the transverse air-passages A, open to the external atmosphere and extending horizontally across the vertical passages above and opening into the central channel, the gas-pipe G, carrying the burner B, the upper screen C, and the ring D, joined to the screen and comprising a pendent annular lip provided with perforations, substantially as shown and described.

In testimony whereof I have signed my name to this specification, in the presence of two subscribing witnesses, this 21st day of March, A. D. 1890.

EDWIN FULLFORD.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*